United States Patent
Falkenauer (10) Patent No.: US 9,245,239 B2
(45) Date of Patent: Jan. 26, 2016

(54) METHOD FOR ORGANIZING A MANUFACTURING OR ASSEMBLING PROCESS

(75) Inventor: Emanuel Falkenauer, Brussels (BE)

(73) Assignee: Optimal Design SPRL, Brussels (BE)

( * ) Notice: Subject to any disclaimer, the term of this patent is extended or adjusted under 35 U.S.C. 154(b) by 1071 days.

(21) Appl. No.: 12/331,321

(22) Filed: Dec. 9, 2008

(65) Prior Publication Data

US 2009/0177305 A1    Jul. 9, 2009

Related U.S. Application Data (63) Continuation of application No. PCT/EP2007/050946, filed on Jan. 31, 2007.

(60) Provisional application No. 60/812,288, filed on Jun. 9, 2006.

(51) Int. Cl.
  *G06F 19/00* (2011.01)
  *G06Q 10/06* (2012.01)
  *G05B 19/418* (2006.01)
  *G06Q 10/00* (2012.01)

(52) U.S. Cl.
  CPC .......... *G06Q 10/00* (2013.01); *G05B 19/41865* (2013.01); *G05B 19/41805* (2013.01); *G05B 2219/31052* (2013.01)

(58) Field of Classification Search
  CPC .............. G05B 19/41805; G05B 2219/31052; G05B 2219/31053; G05B 2219/45234; G06Q 10/06316; G06Q 10/06
  See application file for complete search history.

(56) References Cited

U.S. PATENT DOCUMENTS

| | | | |
|---|---|---|---|
| 5,093,794 A * | 3/1992 | Howie et al. | 700/100 |
| 5,177,688 A | 1/1993 | Rentschler et al. | |
| 5,523,960 A * | 6/1996 | Jeong | 703/6 |
| 2002/0138673 A1* | 9/2002 | Schaffer et al. | 710/28 |
| 2005/0021164 A1* | 1/2005 | Surholt et al. | 700/106 |
| 2007/0239363 A1* | 10/2007 | Reaume et al. | 702/19 |

FOREIGN PATENT DOCUMENTS

WO    WO 02/056125    7/2002

OTHER PUBLICATIONS

International Search Report issued in PCT/EP2007/050946 on Apr. 26, 2007 in 3 pages.
Becker, et al.; "A Survey on Problems and Methods in Generalized Assembly Line Balancing;" Jenaer Schriften Zur Wirtschaftswissenschaft, vol. 2003, No. 21. (http://www.wiwi.uni-jena.de/Papers/wp-sw2103.pdf).

* cited by examiner

*Primary Examiner* — Kenneth M Lo
*Assistant Examiner* — Sunray R Chang
(74) *Attorney, Agent, or Firm* — Knobbe Martens Olson & Bear, LLP (57) ABSTRACT

A method and system for organizing a process having a plurality of operations is described. The process can be a manufacturing or assembly process. Some sequences of operations in the process are unfeasible. The method includes ordering the various operations of the process in a sequence by iteratively performing via a computer environment the acts of adding information on either a mandatory or an allowable sequence between two operations, and determining from the information on the sequence between the two operations further information on mandatory or allowable relations between operations of the plurality of operations, until all relations between couples of operations of the plurality have been determined. The method further includes organizing the process compliant with the set of relations obtained in the ordering via the computer environment.

27 Claims, 4 Drawing Sheets

METHOD FOR ORGANIZING A MANUFACTURING OR ASSEMBLING PROCESS

RELATED APPLICATIONS

This is a continuation application under 35 U.S.C. §120 of PCT/EP2007/050946 filed on Jan. 31, 2007, and which was published as WO 2007/141053 A1 on Dec. 13, 2007, having the title "Method for Organising a Manufacturing or Assembling Process", the disclosure of which is hereby incorporated by reference in its entirety. PCT/EP2007/050946 claims the benefit of U.S. Provisional Application No. 60/812,288, filed on Jun. 9, 2006, the disclosure of which is hereby incorporated by reference in its entirety.

BACKGROUND

1. Field of the Invention

The present invention relates to a method for organizing and carrying out a production process comprising a plurality of operations.

2. State of the Art

For manufacturing or assembling a product it is well known that the various operations must be carried out in some sequence. It is also easy to identify a feasible sequence of operations of manufacture or assembly of an existing product: one only needs to examine in what sequence the operations are carried out in reality.

A concept related to that of a sequence of operations is the concept of true precedence constraint. In a manufacturing process and particularly in the assembly of products, this concept of precedence between operations (or tasks) can be of importance. A precedence constraint expresses the fact that, for whatever reason, an operation Op2 can only be started after another operation Op1 was successfully terminated, i.e., that the completion of the latter is a necessary prerequisite of the former. Op1 is then said to be a predecessor of Op2 (that is, Op1 must precede Op2) and, conversely, Op2 is said to be a successor of Op1 (that is, Op2 must follow Op1).

A detailed and complete knowledge of precedence constraints among the operations needed to produce or assemble the final product, is necessary in particular when the production or assembly process is to be optimized by an automated algorithm, such as an automatic line balancing algorithm. Indeed, the precedence constraints ensure that the sequence of operations resulting from the optimization will be feasible with respect to the actual manufacturing or assembly process as far as the order of the operations is concerned. Despite their practical importance, precedence constraints have been notoriously difficult to collect and to validate.

A precedence constraint (or simply a precedence) among two operations typically arises from the structure of the product being manufactured or assembled, and the technology used in the manufacturing or assembly process. If Op1 is a predecessor of Op2, then Op2 is unfeasible with the technology as long as Op1 was not successfully terminated or, conversely, Op1 is unfeasible once Op2 was started.

The following are three typical examples of precedence constraints, although many other reasons may give rise to a precedence constraints among operations:

EXAMPLE 1

Op1: place object A into box B
Op2: close the lid of box B
Op1 is a predecessor of Op2, because once the lid is closed, placing A into B becomes unfeasible.

EXAMPLE 2

Op1: drill hole H into part C
Op2: cut thread T in hole H
Op2 is a successor of Op1, because it is impossible to cut a thread in hole H if the hole has was not previously drilled into C.
Op3: screw screw S into the threaded hole H
Op3 is a successor of Op2, because S cannot be screwed into H if the thread was not previously cut in H (unless a special technology is used to cut the thread during the screwing operation itself).

EXAMPLE 3

Op1: fix steering wheel's axis onto the vehicle
Op2: fix steering wheel into the vehicle
Op2 is a successor of Op1, because without the steering wheel's axis already fixed onto the vehicle, the steering wheel cannot be fixed into the vehicle (unless a very special technology is used to maintain the wheel in place while the axis is being subsequently added).

As already pointed out, a precedence constraint expresses the fact that the two operations involved must be performed in the order given by the constraint, otherwise one or both of them would be unfeasible. This means that any feasible sequence of operations in the manufacturing or assembly process must comply with all precedence constraints existing among the operations—violating any of the precedence constraints would yield an unfeasible manufacturing or assembly process.

Furthermore, the set of all precedence constraints must be explicitly available in a form that can be submitted to an algorithm, e.g., a digital computer file or a (set of) database record(s), such that the algorithm be capable, without further human intervention, to verify whether any sequence of the operations is feasible with respect to (w.r.t.) the precedence constraints. This means that all precedence constraints among operations pertaining to the manufacture or assembly of a product must be collected prior to execution of the algorithm.

All of the purported precedence constraint among operations in a manufacturing or assembly process must be true, i.e., must express the actual order of operations that ensures the feasibility of the process. If, for instance, a set of precedence constraints relative to any of the three examples above contained the precedence constraint "Op1 is a successor of Op2", then any sequence of operations compliant with that set of constraints would in fact be unfeasible w.r.t. the actual manufacturing or assembly process, because Op1 must be finished before Op2 may start in all of the examples.

Furthermore, the set of precedence constraints submitted to the said algorithm must be complete, i.e., it must contain all the precedence constraints pertaining to the manufacturing or assembly process. Indeed, if any of the constraints was missing from the set, then the algorithm could conclude that some sequence of the operations is feasible even though it would in fact be unfeasible, since it would violate the missing precedence constraint.

Consider for instance any of the three Examples above, and suppose that the precedence constraint "Op1 is a predecessor of Op2" is missing from the set of precedence constraints submitted to the algorithm. The algorithm could then propose a sequence of the operations where Op2 would be performed before Op1, because the algorithm would not have the information that Op2 must in fact follow Op1 for the process to be feasible. The algorithm could therefore propose an unfeasible process, which would invalidate the result of the algorithm.

Consequently, as long as a set of precedence constraints pertaining to the operations in a manufacturing or assembly process was not validated as being true and complete, any sequence compliant with the set can be unfeasible. In particular, the results of any algorithm working with a set of precedence constraints not validated as being true and complete, must be considered unreliable, because it could represent an unfeasible manufacturing or assembly process.

Regardless of the importance of collection of a true and complete set of precedence constraints pertaining to the manufacturing or assembly process, and the validation of such set as being indeed true and complete, such collection and validation has been notoriously difficult to carry out for many processes, m particular processes involving a large number of operations.

The difficulty to collect precedence constraints stems from the fact that m order to establish that an operation Op1 must precede an operation Op2 (i.e., that Op1 is a predecessor of Op2), one must establish that not a single sequence of operations (not only of Op1 and Op2, but of all operations in the process) where Op1 would follow Op2 is feasible, that is, that all possible sequences where Op1 would follow Op2 are unfeasible. There is an extremely large number (thousands or more) of such sequences, and establishing infeasibility of most of them requires a detailed knowledge of the product being manufactured or assembled and the technology used. Clearly, establishing even a single precedence constraint may be extremely difficult and time-consuming, especially for processes with a large number of operations.

On the other hand, making sure that a purported precedence constraint is true requires the verification that all possible sequences of operations compliant with that constraint, together with all the other constraints possibly already in place, are indeed feasible. Again, there is typically an extremely large number of such sequences.

The difficulty to validate a given set of precedence constraints for a given manufacturing or assembly process stems from the fact that, as pointed out above, such set must be complete, i.e., no precedence actually required for the feasibility of the process can be missing. Such validation is perhaps even more difficult than the collection of the set, since it requires to check that for each pair of operations not subject to a precedence constraint, at least one feasible sequence compliant with the set exists for each of the two orders of the operations in the pair. In other words, validating a set of precedence constraints means not only validating that all the constraints in the set are true, but also that no precedence constraint was forgotten or overlooked.

Precedence constraints are known in the art, for example from WO02/056125. This document relates to component placement machine optimizers configurable to handle arbitrary numbers of precedence constraints in an efficient way. It starts from a given set of precedence constraints (see FIG. 5 of the document) including at least a first class of constraints that apply to only one component placement machine type and a second class of constraints that apply to more than one component placement machine type. Assignment of constraints to the different classes is based on decisions of a part splitter module of the modular optimizer regarding which parts are assigned to which machine types. WO02/056125 however does not deal with a situation wherein a set of precedence constraints still remains to be determined.

SUMMARY

In one embodiment there is a computerized method of organizing a process comprising a plurality of operations, whereby some sequences of operations in the process are unfeasible, the method comprising a) ordering the various operations of the process in a sequence by iteratively performing via a computer environment the acts of adding information on either a mandatory or an allowable sequence between two operations, and determining from the information on the sequence between the two operations further information on mandatory or allowable relations between operations of the plurality of operations, until all relations between couples of operations of the plurality have been determined; and b) organizing the process compliant with the set of relations obtained in the ordering via the computer environment. The method wherein a) further may comprise an act of calculating a measure of the number of possible orders of operations that remain to be validated. The measure may be used to determine which information is to be added in a next iteration.

A weight may be assigned to at least some of the determined relations between couples of operations and wherein the weights may be used for deriving how a specific relation was established. The information on mandatory or allowable sequences may be stored in a storage device. The information on the mandatory or allowable sequences may be checked for possible conflicts with previously determined relations before it is added. The mandatory sequence between the two operations may be a precedence constraint. The process may be a manufacturing or an assembly process.

In another embodiment, there is a computerized system for ordering a plurality of operations of a manufacturing or an assembly line process, whereby some sequences of operations are unfeasible, the system comprising an input arranged for inputting information on a mandatory or allowable sequence between two operations and for determining from the input information on the sequence between the two operations further information on mandatory or allowable relations between operations of the plurality of operations. The system may further comprise storage media for storing the information on mandatory or allowable relations.

In yet another embodiment, there is a computer readable medium having computer readable program code embodied therein for ordering a plurality of operations of a process in a sequence, the computer readable code comprising instructions for adding information on either a mandatory or an allowable sequence between two operations, and determining from the information on the sequence between the two operations further information on mandatory or allowable relations between operations of the plurality of operations, until all relations between couples of operations of the plurality of operations have been determined. The computer readable medium may comprise a first data structure for storing information on the mandatory sequences. The computer readable medium may comprise a second data structure for storing information on the allowable sequences. The computer readable code may further comprise instructions for organizing the process compliant with the determined relations between the couples of operations. The computer readable medium may be further arranged for carrying out an automatic line balancing algorithm based on the determined relations. Some sequences of operations in the process may be unfeasible. The process may be a manufacturing or an assembly process.

DETAILED DESCRIPTION OF CERTAIN EMBODIMENTS

Embodiments of the present invention provide a method for carrying out a manufacturing or assembly process comprising a plurality of operations, whereby all relations between couples of operations are established and wherein subsequently the manufacturing or assembly process is carried out accordingly. Embodiments of the present invention employ two related, yet distinct concepts, namely a 'valid order' of two operations and a 'precedence constraint' between two operations.

Figure 1A:
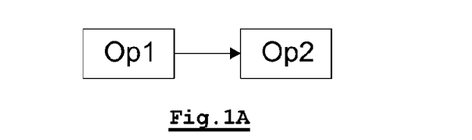
FIG. 1A represents a valid order of two operations.

A valid order of two operations, graphically represented as in FIG. 1A and in the sequel denoted Op1→Op2, means that the operations may be performed in that order. More formally, it means that there exists at least one feasible sequence of all operations in the manufacturing or assembly process where Op1 is started before Op2 is terminated.

Figure 1B:
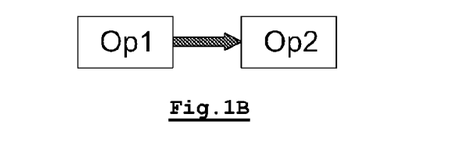
FIG. 1B represents a true precedence constraint between two operations.

On the other hand, a true precedence constraint between the two operations, graphically represented as in FIG. 1B and denoted in the sequel as Op1⇨Op2, means that Op1 must precede Op2. More formally, it means that Op1 must be successfully terminated before the start of Op2 (or, conversely, Op2 cannot start before a successful termination of Op1), i.e., that no feasible sequence of operations exists with Op2 starting before Op1 was successfully terminated. Clearly, a precedence constraint among two operations is a stronger relation than an order, because the precedence expresses a necessity (Op1 must be finished before the start of Op2), while the order expresses a mere possibility (Op1 may start before Op2 is finished).

Although the two concepts of valid order and true precedence constraint are distinct, they are strongly related in the following sense:

Fundamental Relation 1

If Op1 may start before Op2 is finished,
then it cannot be the case that Op1 must start after the successful termination of Op2 (i.e., that Op1 be a successor of Op2).

Figure 2:
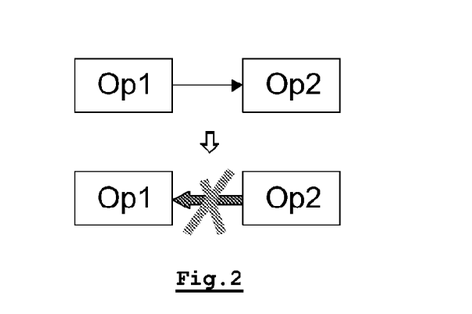
FIG. 2 represents fundamental relation 1.

In other words, a valid order in one direction makes the true precedence constraint in the reverse direction impossible: if the order 'Op1 before Op2' is indeed valid, then the precedence constraint 'Op1 is a successor of Op2' cannot be true. Precedence constraints thus cannot go in both directions simultaneously, they form an acyclic graph. FIG. 2 graphically expresses fundamental relation 1.

Note also the different situation in case of valid orders: Op1→Op2 does not necessarily exclude Op2→Op1. It simply means that both orders are valid. Hence, valid orders can go in both directions simultaneously, they do not necessarily form an acyclic graph.

Figure 3A:
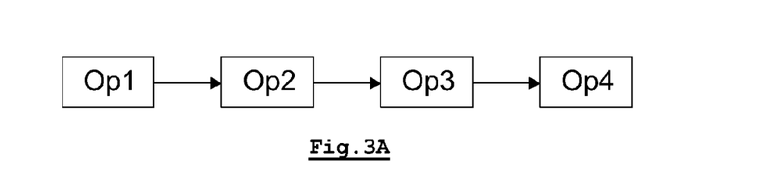
FIG. 3A represents a sequence of operations and FIG. 3B the information derived from said sequence.

The Fundamental Relation 1 between a valid order of operations and precedence constraints among them can be used to assist in the collection and validation of precedence constraints, by exploiting knowledge that is 'hidden' in sequences of operations. Indeed, collecting and validating a set of precedence constraints involves verifying an extremely large number of possible sequences. This large number makes establishing precedence constraints difficult. However, using the above Fundamental Relation 1, it is possible to eliminate large numbers of such verifications that actually need to be carried out. Consider for instance a sequence of operations as shown in FIG. 3A and suppose the sequence is feasible with respect to the actual manufacturing or assembly process. According to the above definition the following orders of operations are then valid, because there is indeed at least one feasible sequence where the operations are carried out in that order:

Op1→Op2

Op2→Op3, and

Op3→Op4, but also

Op1→Op3,

Op1→Op4, and

Op2→Op4.

Figure 3B:
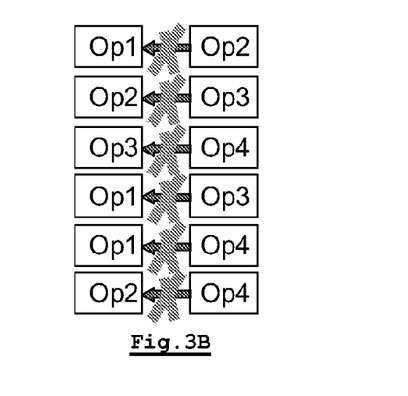

Any feasible sequence of N operations implies $(N*(N-1))/2$ valid orders among couples of operations of the group of N operations. Each of the valid orders in FIG. 3A implies that the reverse precedence constraint among the two operations cannot be true (see FIG. 3B). Consequently, all those precedence constraints can be eliminated from the set of possible precedence constraints that would otherwise need to be checked for validity.

One of the main difficulties in validating a given set of precedence constraints is that the set is only valid if it is complete, because otherwise an unfeasible sequence of operations could be deemed feasible merely because the relevant precedence constraint is missing from the set.

If collecting precedence constraints is difficult, validating a given set is even more so: one should, in principle, examine all couples of operations without a precedence constraint among them, and validate that indeed no such precedence is required. Fortunately, it is possible to take advantage of the Fundamental Relation 1 above to eliminate impossible precedence constraints. If for a couple of operations, both of the two possible precedence constraints among them can be eliminated by applying the Fundamental Relation 1, then it is certain that no precedence relation can exist among the couple. The absence of any precedence constraint among the couple of operations is therefore validated as being true.

Consider now a given set of precedence constraints and all couples of operations that have no precedence constraint among them present in the set. Typically, there is a very large number of such couples, even in processes with modest numbers of operations. However, if for every couple of operations with no precedence constraint among them, the absence of any precedence constraint can be validated by applying Fundamental Relation 1, then all the precedence constraints absent in the set are validated as being true and, by definition, the set as a whole certainly is complete.

The above conclusion that it is possible to validate the absence of precedence constraints by the presence of certain valid orders of operations, can be of practical importance. Indeed, a major difficulty in validating a set of precedence constraints is that if there is no precedence constraint among a couple of operations, then there is typically no explicit piece of data in the set to support the fact, because the precedence constraint is absent. Unfortunately, if two operations should have a precedence constraint among them (due to the structure of the product and the technology used in the actual manufacturing or assembly process) and yet that constraint is missing from the set, then the precedence constraint set contains exactly the same information, namely that the precedence constraint is absent.

Given a set of precedence constraints, it is thus impossible to tell solely on the basis of the set, whether a precedence constraint absent from the set is indeed not required (that is, both orders of the operations are feasible), or whether in fact it should be in the set but was overlooked or forgotten. This uncertainty gives rise to a fundamental distrust in any set of precedence constraints and, by extension, in any result obtained with the set, such as the result of an automatic line balancing algorithm. Line balancing is an optimization problem well known by people familiar with the craft of operations research and industrial production optimization. An automatic line balancing algorithm is an algorithm for the optimization of the repartition of the different tasks or actions on a production line between different (equivalent) workers (or machines capable of performing different tasks). In such an optimization, one should first divide the operations in elementary operations (that cannot be further divided), take into account the precedence constraints, determine the sequence to perform the operation, and determine the time needed for each elementary operation. Balancing the line consists then in grouping different tasks so that the dead time of the different workers (and/or machines) is minimized or the efficiency is maximized under predetermined constraints. In practice, it is extremely difficult to balance a line having hundreds of operation, which is the reason why it is preferably optimized by an automated algorithm. In such a balancing process, it is of importance to know all precedence constraints, and to have each operation reduced to undividable elementary operations to have the best flexibility in the optimization process.

This fundamental distrust in any set of precedence constraints in turn makes mandatory an extremely lengthy and costly verification of any such result, putting in doubt the very usefulness of the tool that supplied the result. Fortunately, Fundamental Relation 1 allows eliminating the uncertainty completely. Indeed, if a given set of precedence constraints is validated as being complete, in the way described previously, then for every couple of operations, the following explicit information is available:

either there is a precedence constraint among the two operations or there is a couple of valid orders of the two operations, one in each direction, validating the absence of a precedence constraint among them.

The fact that both the presence and the absence of a precedence constraint among a couple of operations is validated by explicit information can be important, because such information can be stored in a database, attached a description of the reasons that gave rise to it, attributed to an author, dated in time, etc. In short, it is possible to trace the origin of the information, which makes it possible to, in particular, consult its author in case the validity of the information needs to be ascertained.

On the other hand, since the presence or absence of a precedence constraint among any couple of operations is validated by explicit information, it is easy to detect couples of operations whose precedence status is not validated: such couples simply lack information that would either establish the presence of a precedence constraint or validate its absence. Such couples of operations can therefore be highlighted as requiring additional effort to establish their precedence status. This, too, can be important: to validate a set of precedence constraints, it is no longer necessary to just "check everything" (often a daunting task), since it is possible to identify couples of operations that indeed need closer scrutiny.

For an incomplete set of precedence constraints and valid orders, it is actually possible to compute a measure indicating to which extent it is incomplete, the Validation Gap. To do so, one simply needs to scan all couples of operations and examine their precedence status. Starting with Validation Gap=0, for each couple of operations the following must be done:

if there is a precedence constraint among the operations or both orders of the operations have been validated, then the precedence status of the couple is fully established: leave Validation Gap unchanged, if there is exactly one known valid order among the operations, add 1 to Validation Gap, if there is no known valid order among the operations, add 2 to Validation Gap.

The resulting Validation Gap is the number of operation orders that have not been explicitly validated. To obtain a fully validated set of precedence constraints and operation orders, each of the as yet not validated orders needs to be validated, so the Validation Gap represents a measure of the amount of work necessary to obtain a fully validated set.

While the possibility to validate by explicit information both the presence and the absence of a precedence constraint among any couple of operations is extremely valuable, the practical advantage would be limited if the effort spent on such validation was the same as the effort needed to verify the precedence status of every couple of operations. Fortunately, that turns out not to be the case, since it is possible to take advantage of existing knowledge (known precedence constraints and/or valid orders) to strongly leverage the impact of new knowledge.

Suppose that for a given set of operations, some precedence constraints have already been validated as being true. It is possible to take advantage of such known precedence constraints by Fundamental Relation 2.

Fundamental Relation 2

If Op1 must be finished before Op2 is started (i.e., Op1 is a predecessor of Op2)

and Op2 must be finished before Op3 is started (i.e., Op2 is a predecessor of Op3)

then Op1 must be finished before Op3 is started, too, i.e., Op1 is a predecessor of Op3.

Figure 4:
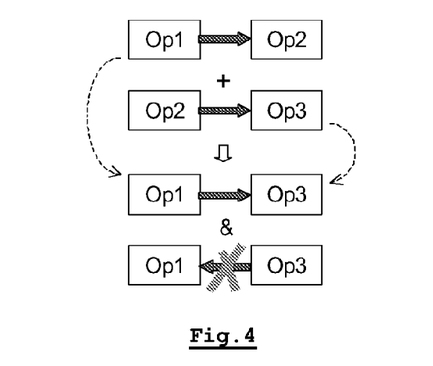
FIG. 4 represents fundamental relation 2.

Graphically, this Fundamental Relation can be represented as in FIG. 4. The additional knowledge of the precedence constraint 'Op2 is a predecessor of Op3' validates the precedence constraint 'Op1 is a predecessor of Op3', which also eliminates the option of the reverse precedence constraint among Op1 and Op3: the impact of the newly established precedence propagates along the already known true precedence. Needless to say, if Op2 has more than one predecessor, and/or if Op1 itself has predecessors, then the new precedence constraint propagates along those precedence constraints as well, thus validating and eliminating many precedence constraints.

While the above allows combining new precedence constraints with other, already known precedence constraints, it is also possible to combine new precedence constraints with already known valid orders, by using Fundamental Relation 3.

Fundamental Relation 3

If Op1 must be finished before Op2 is started (i.e., Op1 is a predecessor to Op2)

and Op2 can start before Op3 is finished, then Op1 can start before Op3 is finished, too, i.e., it cannot be the case that Op1 is a successor of Op3.

Figure 5:
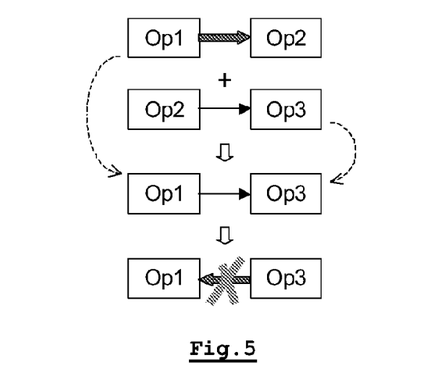
FIG. 5 represents fundamental relation 3.

Graphically this relation can be expressed as in FIG. 5. The additional knowledge of the valid order Op2→Op3 eliminates the possibility of one of the two potential precedence constraints among Op1 and Op3: the impact of the newly established valid order propagates along the already known true precedence. Clearly, if Op2 has more than one predecessor, and/or if Op1 itself has predecessors, then the new valid order propagates along those precedence constraints as well, thus eliminating the possibility of many precedence constraints.

Suppose that for a given set of operations, some orders among couples of operations have already been validated, i.e., they are known to be valid orders. It is possible to take advantage of such known valid orders, thanks to Fundamental relation 4.

Fundamental Relation 4

If Op1 can start before Op2 is finished
and Op2 must be finished before Op3 is started,
then Op1 can start before Op3 is finished, too, i.e., it cannot be the case that Op1 be a successor of Op3.

Figure 6:
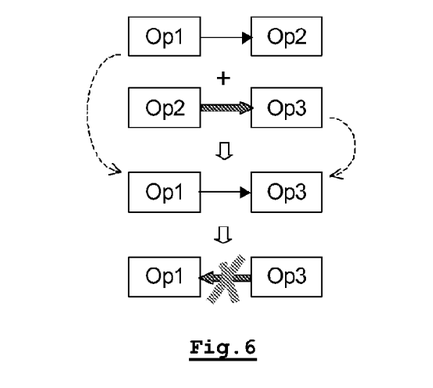
FIG. 6 represents fundamental relation 4.

Graphically, this Fundamental Relation 4 can be represented as in FIG. 6. The additional knowledge of the precedence constraint Op2⇨ Op3, combined with the known valid order Op1→Op2, eliminates the possibility of one of the two potential precedence constraints among Op1 and Op3. Needless to say, the newly inferred valid order can be propagated along other already known precedence constraints according to the Fundamental Relation 3, validating yet more orders among operations, which in turn can themselves propagate along yet other known precedence constraints, thus eliminating the possibility of many precedence constraints.

A further useful observation is the following. Any valid inference of a new valid order must use exactly one previously known valid order. Using none would imply an inference of a precedence constraint (rather than a valid order), while using two or more would necessarily mean a potentially uncertain combination of at least two valid orders.

As each new relation among two operations propagates along already known precedence constraints and valid orders according to the Fundamental Relations above, the addition of even a single new precedence constraint or valid order may implicitly eliminate the possibility of many potential precedence constraints. That, in turn, reduces the number of relations that still need to be explicitly validated to obtain a set of precedence constraints validated to be complete. The full impact of the addition of a new relation is computed by propagating its implications along all already known precedence constraints and valid orders, according to the Fundamental Relations 2, 3 and 4 identified above, while eliminating impossible constraints according to the Fundamental Relation 1. This task is preferably performed by a computer program.

Figure 7A:
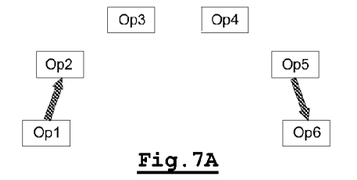
FIGS. 7A-7F represent an example of how relations between operations are established.
Figure 7B:
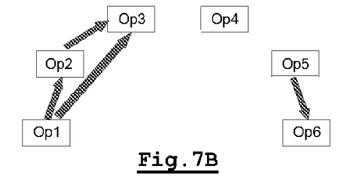
Figure 7C:
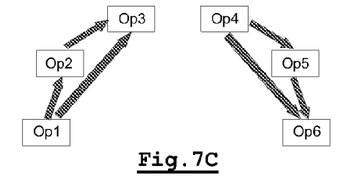
Figure 7D:
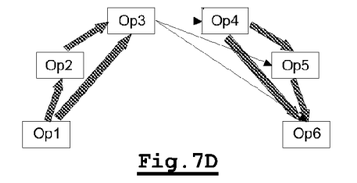
Figure 7E:
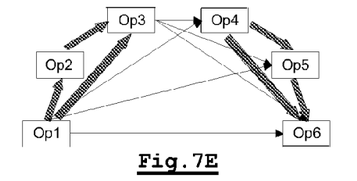
Figure 7F:
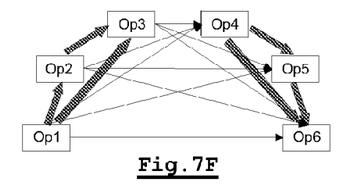

For illustration purposes an elaborated example is now given. Consider six operations, Op1 through Op6, with no precedence constraint or valid order among any of them. Suppose the relations shown in FIG. 7A are added, i.e., explicitly input by the user: precedence constraints Op1⇨ Op2 and Op5⇨ Op6. Next, the user adds Op2⇨ Op3. From this information can immediately be derived there is a precedence constraint between Op1 and Op3 (see FIG. 7B). After adding the information Op4⇨ Op5, one disposes of the information shown in FIG. 7C. Then the valid order Op3→Op4 is introduced. By applying the above-mentioned fundamental relations several more valid orders can be established, as shown in FIG. 7D-7E-7F. For example, in FIG. 7D first Op3→Op5 can be derived from Op3→Op4 and Op4⇨ Op5 and then from Op3→Op5 and Op5⇨ Op6 follows Op3→Op6. In FIG. 7E is shown how from the previously established relation Op1⇨ Op3 and from Op3→Op4 can be derived that Op1→Op4 holds and so on. Finally one disposes of all information on relations between operations shown in FIG. 7F. The explicit introduction of just four precedence constraints and one valid order has implicitly established two more precedence constraints and eight more valid orders. Each of the new precedence constraints having eliminated the possibility of another precedence constraint (its opposite), and each of the new valid orders the possibility of a precedence constraint (in the opposite direction), the five relations explicitly input managed to implicitly eliminate twelve more precedence constraints which, therefore, will not need an explicit check. Counting the five precedence constraints eliminated by the five relations given explicitly, there are seventeen precedence constraints eliminated from need of further explicit check.

A computer algorithm implementing the method as previously explained, advantageously employs two data structures containing the following information:

IsDSucc (PredOp, SuccOp): returns true if operation SuccOp is a direct successor of PredOp, i.e., there is a precedence constraint that originates in PredOp and terminates in SuccOp. IsDSucc returns false otherwise.

MayFollow (PredOp, SuccOp): returns true if the order PredOp→SuccOp is a valid order and returns false otherwise.

These data structures can be practically implemented in a variety of ways, e.g., as Boolean matrices, adjacency lists, Boolean functions, etc. The MayFollow data structure makes it easy to find out whether a given precedence constraint still needs explicit validation, or whether it is known to be impossible, given the already validated precedence constraints and operation orders. Indeed, the MayFollow data structure contains all valid orders among couples of operations, so by virtue of the Fundamental Relation 1 above, one has the following:

If MayFollow (Op1, Op2)=true then the precedence constraint "Op2 is a predecessor of Op1" is impossible.

In other words, precedence constraints are eliminated implicitly, by keeping the data structure MayFollow up to date at all times.

The computer algorithm and/or other illustrative logical blocks, modules, and circuits described in connection with the embodiments disclosed herein may be implemented or performed by a computer environment including a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in any suitable computer readable medium such as a volatile or non volatile memory such as a DRAM memory, flash memory, ROM memory, EPROM memory, EEPROM memory, registers, hard disk, magnetic tape, a memory card, a removable disk, a CD-ROM, a DVD, or any other form of suitable storage medium known in the art. An exemplary storage medium is coupled to the processor such that the processor can read information from, and write information to, the storage medium. In the alternative, the storage medium may be integral to the processor. The processor and the storage medium may reside in an ASIC or in any suitable commercially available chipset.

In the process of collection and validation of a set of precedence constraints, it is desirable to identify couples of operations that should be examined with higher priority than others, since this guides the process in useful directions. One appealing measure of such priority is the Future Validation Gap, i.e., the Validation Gap (as defined above) that would be obtained if an as yet not validated relation between a couple of operations was indeed validated.

The Future Validation Gap is easily computed by adding the as yet not validated relation (a precedence constraint among two operations, or a valid order of the couple) to the set of already validated relations (precedence constraints and valid orders) as if it was itself validated, and computing the resulting Validation Gap. Naturally, when adding the purported new relation, its full impact needs to be computed, by propagation along the already validated relations, as previously described.

A useful guidance in the process of collection and validation of precedence constraints is therefore obtained as follows. For each couple of operations and each precedence relation among the couple (precedence constraint in either direction and the two orders of the operations) that is not already validated, the Future Validation Gap is computed. The relations yielding the smallest Future Validation Gap are the ones to be examined for validity with the highest priority. Indeed, if such a high-priority relation can be validated, then the resulting Validation Gap will be small, i.e., the remaining effort to validate the whole set of precedence constraints will be minimized. If, on the contrary, such a high-priority relation cannot be validated, then this fact (that it indeed cannot be validated) will be the easiest to verify. The latter observation stems from the fact that a high-priority relation has, by definition, a large impact, i.e., it verifies and/or eliminates the possibility of a high number of relations, and it is sufficient to verify that at least one of those verifications and eliminations is impossible, to conclude that the high-priority relation cannot be validated.

In practice in the industry there are often several sources of precedence constraints and valid orders: for example, the design department, with sub-departments working on different parts of the product, the production department, the virtual factory or simulation department, logistics, etc. . . . The domains of work and expertise of these sources are distinct and the constraints taken into account vary from one domain to another. Given these differences, it often happens that the precedence constraints and valid orders supplied by one source differ from or conflict with those supplied by others. In order to harmonize inputs from the various sources of information, it is highly desirable to exhibit differences or conflicts in information coming from the different sources.

There are two types of information that can be supplied: precedence constraints and valid orders, respectively. A possible conflict between a new piece of information and information already established can be detected in the following way. When a purported precedence constraint Op1⇢Op2 is being input, it is first checked whether the reverse precedence is true. If this is the case, the precedence constraint Op1⇢Op2 does not hold. Then one should verify if MayFollow (Op2, Op1)=true. If this is the case Op1⇢Op2 does not hold. If, on the contrary, also this check is negative, it can be concluded that Op1⇢Op2 can be accepted as a true precedence constraint and added to the set of previously established precedence constraints.

When a purported valid order Op1→Op2 is being input, it is first checked if the reverse precedence (i.e., Op2⇢Op1) is true. If this is not the case, the order Op1→Op2 is accepted as valid and added to the set of previously established valid orders.

With the implicit inference of precedence constraints and valid orders, many relations among operations (i.e., precedence constraints and valid orders) are not explicitly input by the user but implicitly inferred. It is therefore useful to be able to justify how a relation among a given pair of operations was validated. Such a justification becomes necessary upon detection of a conflict. Indeed, in that situation two sources of information advocate mutually incompatible relations among operations and only by inspection of a detailed justification of the existing relation it can be decided which one of the conflicting relations, the existing or the new, is the correct one.

Justifying an inferred relation (precedence constraint or valid order) on the basis of other inferred relations would clearly be devoid of interest. Consequently, only relations explicitly input by the user into the data structures can be used as basis for justifying inferred relations. For precedence constraints this is easy: all relations in the IsDSucc data structure are eligible, because each of them must have been explicitly input by the user at some point. For valid orders this is more difficult, because the MayFollow structure mixes implicitly inferred valid orders with the explicitly input ones. One may therefore need to keep track of all valid operation orders explicitly input by the user. In the sequel the set of relations explicitly input by the user is called 'ExplicitRelations'.

Even when only explicitly input relations are used in a justification, a relation among two given operations may still have many possible justifications. However, it would be impractical to present all of them to the user. In order to decide which justification should be presented to the user, one should remember that the main reason for requesting the justification in the first place, is to verify that the relation is indeed true. From this point of view, the most useful justification is one that is based on the smallest number of explicitly input relations, because the fewer they are, the quicker their correctness can be verified. In other words, the most useful justifications are the simplest ones. For a given relation among two operations, there may be several such justifications.

A graph is a concept well known to anybody familiar with the craft of computer science. A graph is defined by a set of vertices and a set of edges that connect couples of vertices. An illustration of a graph is a map: the vertices are cities and the edges are routes connecting couples of cities. In a directed weighted graph, each edge has a direction (i.e., it is "going" from the origin vertex to the target vertex) and a weight, which is simply a numerical value attached to the edge. In the craft of computer science, it is common to compute various properties of a graph, such as a shortest path from one vertex to another, which is a collection of edges starting in the origin vertex and ending in the target vertex, possibly "visiting" other vertices in the graph, such that all edges in the path are followed in their direction, and that the sum of the weights of the edges traversed by the path is the smallest possible. Note that there may be several such shortest paths.

A justification of a relation among two operations can be obtained by finding a path from the origin operation of the relation to the target operation, in the graph defined by the set of all operations for the vertices, and ExplicitRelations for the edges oriented in the direction of the relations. The respective collections of all operations for vertices and of all relations in ExplicitRelations for edges, form what is called the ExplicitGraph from now on. Indeed, suppose that one seeks a justification of the relation Op1→Op2: if there is a path in ExplicitGraph that starts in Op1 and ends in Op2, then it follows that Op1 may indeed precede Op2. Finding the simplest justification, i.e., one involving the smallest number of relations in ExplicitRelations, boils down to finding a shortest path in ExplicitGraph. However, precautions need to be taken in computing such a path, as a valid justification of a precedence constraint can only involve precedence constraints (i.e., it cannot involve valid orders) in ExplicitRelations and because no valid justification may involve more than just one valid order, as already mentioned.

Both of these requirements are elegantly dealt with by assigning the following weights to the edges in Explicit-Graph:

1 for a precedence constraint
a value equal to the number of vertices in ExplicitGraph (i.e., the number of all operations) for a valid order.

Indeed, with the above weights assigned to the edges in ExplicitGraph, the following observations w.r.t. a shortest path in that graph can be made:

if there is no path going from origin Op1 to target Op2 in ExplicitGraph, then there is no justification for either the purported precedence constraint Op1 ⇢ Op2 or the purported valid order Op1→Op2 if the shortest path going from origin Op1 to target Op2 in ExplicitGraph has a total weight inferior to the number of vertices in ExplicitGraph, then there is a justification for the precedence constraint Op1 ⇢ Op2 if the shortest path going from origin Op1 to target Op2 in ExplicitGraph has a total weight greater than or equal to the number of vertices in ExplicitGraph and less than twice the number of vertices in ExplicitGraph, then there is a justification for the valid order Op1→Op2, but no valid justification for the precedence constraint Op1 ⇢ Op2, because any such justification would involve at least one valid order, if the shortest path going from origin Op1 to target Op2 in ExplicitGraph has a total weight greater than or equal to twice the number of vertices in ExplicitGraph, then there is not only no valid justification for the purported precedence constraint Op1 ⇢ Op2, but also no valid justification for the purported valid order Op1→Op2, because any such justification would involve at least two valid orders.

Any algorithm for computing the shortest path in a directed graph can be used to compute the above-mentioned shortest path in ExplicitGraph, including any of the well-known shortest path algorithms such as Dijkstra's algorithm, etc.

Figure 8:
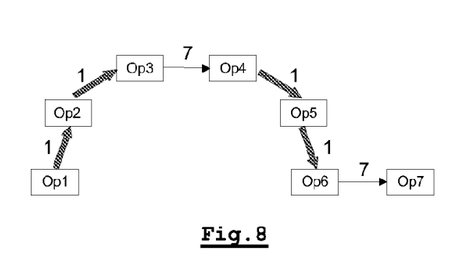
FIG. 8 represents the example of FIG. 7, with an additional operation Op7.

The example discussed in FIG. 7 is again considered to illustrate the above-explained concepts for justification. Suppose there is an additional operation Op7, for which the user has explicitly specified the following relation: Op6→Op7, i.e., 'Op7 may follow Op6'. Given the relations explicitly input by the user and the above rules for edge weights, the ExplicitGraph is as shown in FIG. 8, wherein the edges are labelled by their weight. When computing various shortest paths in this graph, the following is to be noted:

there is no path going from Op5 to Op1, therefore there is neither a precedence constraint Op5 ⇢ Op1, nor a valid order Op5→Op1, the shortest path from Op1 to Op3 has total weight 2, therefore there is a precedence constraint Op1 ⇢ Op3. The precedence constraint is justified by the shortest path: Op1 ⇢ Op2 ⇢ Op3, the shortest path from Op1 to Op6 has total weight 11, therefore there is a valid order Op1→Op6. The valid order is justified by the shortest path: Op1 ⇢ Op2 ⇢ Op3 → Op4 ⇢ Op5 ⇢ Op6, the shortest path from Op4 to Op7 has total weight 9, therefore there is a valid order Op4→Op7. The valid order is justified by the shortest path: Op4 ⇢ Op5 ⇢ Op6→Op7, the shortest path from Op2 to Op7 has total weight 17, which is more than twice the number of vertices in the Explicit-Graph (2*7=14). There is therefore no precedence constraint or valid order with those endpoints in that order, i.e., neither Op2 ⇢ Op7 nor Op2→Op7 is a valid relation.

It must be noted that, if it was not for efficiency reasons (computing shortest paths in a large graph may be time consuming), it would be possible to register only the relations explicitly input by the user, and infer all relations among operations solely on the basis of shortest paths among them, as described above.

Since the justification of a relation (precedence constraint or valid order) among two operations is given by a shortest path in ExplicitGraph, the justification only contains relations that have been explicitly input by the user at some point. This property is extremely valuable in environments where several users input relations among operations, possibly over a long period of time. Note that such a situation arises in particular in industrial environments where several sources of information collaborate to establish a coherent set of precedence constraints, as already mentioned.

By keeping track of the identity of the user who inputs any new relation among operations and when he or she does so, it is possible to identify the author(s) of any relation among two operations: simply compute the justification of the relation as described above, and for each relation in the justification, list the user who input it and when. Since each of the relations it contains was indeed explicitly input at some point, it is certain that the required information is always available.

For instance, in the example above, the valid order Op4→Op7 results from the joint work of the following authors:

the one who input the precedence constraint Op4 ⇢ Op5,
the one who input the precedence constraint Op5 ⇢ Op6, and
the one who input the valid order Op6→Op7.

The method of embodiments of the present invention thus presents a rigorous formal manner for supporting and collecting and validating precedence constraints involved in the manufacturing or assembly of a product of any kind. As already stated the method is preferably implemented as a software tool. An important advantage of embodiments of the method is that it requires the user to explicitly validate precedence constraints and valid orders among operations, which makes it possible to keep track of such validations. The method is capable to leverage the impact of any explicit validation by implicitly validating all relations that are implied by the new validation, given the validated relations already supplied, thus significantly reducing the number of necessary explicit validations. The method allows detecting which relations have not been validated (either explicitly or implicitly), concentrating the effort of the user on relations that really need explicit validation. In particular, the method detects when the validated relations amount to a complete set of validated relations, i.e., when they are sufficient to be certain that no necessary relation has been overlooked or forgotten.

Furthermore, in the method for organizing a manufacturing or assembly process useful guidance can be provided in the collection and validation of the precedence constraints, by pointing out the relations that are to be validated with the highest priority such that the remaining effort to establish a complete set of such relations is minimized. Conflicts between relations among operations can be detected. Any previously validated relation can be justified by indicating the author(s) who input the information that implies the relation.

What is claimed is:

1. A computerized method of organizing a process comprising a plurality of operations, whereby some sequences of operations in the process are unfeasible, the method comprising:
   a) ordering the various operations of the process in a sequence by iteratively performing via a computer environment the acts of:
      adding mandatory or allowable sequence information associated with two operations, and
      determining from the mandatory or allowable sequence information further mandatory or allowable relations information between couples of operations of the plurality of operations,
      until all relations between couples of operations of the plurality have been determined; and
   b) organizing the process compliant with the set of relations obtained in the ordering via the computer environment.

2. The method of organizing a process as in claim 1, wherein a) further comprises an act of calculating a measure of the number of possible orders of operations that remain to be determined.

3. The method of organizing a process as in claim 2, wherein the measure is used to determine which information is to be added in a next iteration.

4. The method of organizing a process as in claim 1, wherein a weight is assigned to at least some of the determined relations between couples of operations and wherein the weights are used for deriving how a specific relation was established.

5. The method of organizing a process as in claim 1, wherein the mandatory or allowable sequences information is stored in a storage device.

6. The method of organizing a process as in claim 1, wherein the mandatory or allowable sequence information is checked for possible conflicts with previously determined relations before it is added.

7. The method of organizing a process as in claim 1, wherein the mandatory sequence between the two operations is a precedence constraint.

8. The method of organizing a process as in claim 1 wherein the process is a manufacturing or an assembly process.

9. The method of organizing a process as in claim 1, additionally comprising performing a manufacturing or assembly operation based on the organizing.

10. The method of organizing a process as in claim 1, wherein a subset of all possible sequences of the plurality of operations are evaluated until all relations between couples of operations of the plurality are determined.

11. The method of organizing a process as in claim 1, wherein the further mandatory or allowable relations information is dynamically computed during the iteration.

12. The method of organizing a process as in claim 1, wherein each mandatory relation is a relation where a first operation must be successfully terminated before the start of a second operation.

13. The method of organizing a process as in claim 1, wherein each allowable relation is a relation where a first operation may be successfully terminated before the start of a second operation.

14. The method of organizing a process as in claim 13, wherein there is a sequence of operations in the allowable relationship where a first operation is started before a second operation is terminated.

15. A computerized method of organizing a process comprising a plurality of operations, whereby some sequences of operations in the process are unfeasible, the method comprising:
   a) ordering the various operations of the process in a sequence by iteratively performing via a computer environment the acts of:
      accessing mandatory or allowable sequence information associated with two operations, and
      computing from the accessed information, new mandatory or allowable relations information between couples of operations of the plurality of operations,
      until all relations between couples of operations of the plurality have been determined; and
   b) organizing the process compliant with the set of relations obtained in the ordering via the computer environment.

16. The method of organizing a process as in claim 15, wherein a) further comprises calculating a measure of the number of possible orders of operations that remain to be determined.

17. The method of organizing a process as in claim 16, wherein the measure is used to determine which information is to be accessed in a next iteration.

18. The method of organizing a process as in claim 15, wherein a weight is assigned to at least some of the determined relations between couples of operations and wherein the weights are used for deriving how a specific relation was established.

19. The method of organizing a process as in claim 15, wherein the mandatory or allowable sequence information is stored in a storage device.

20. The method of organizing a process as in claim 15, wherein the mandatory or allowable sequence information is checked for possible conflicts with previously determined relations before it is added.

21. The method of organizing a process as in claim 15, wherein the mandatory sequence between the two operations is a precedence constraint.

22. The method of organizing a process as in claim 15, wherein the process is a manufacturing or an assembly process.

23. The method of organizing a process as in claim 15, wherein the new mandatory or allowable relations information is dynamically computed during the iterative performing.

24. The method of organizing a process as in claim 15, wherein each mandatory relation is a relation where a first operation must be successfully terminated before the start of a second operation.

25. The method of organizing a process as in claim 15, wherein each allowable relation is a relation where a first operation may be successfully terminated before the start of a second operation.

26. The method of organizing a process as in claim 25, wherein there is a sequence of operations in the allowable relationship where a first operation is started before a second operation is terminated.

27. A computerized method of organizing a process comprising a plurality of operations, whereby some sequences of operations in the process are unfeasible, the method comprising:
   a) ordering, via a computer environment, the various operations of the process in a sequence by iteration of:

accessing precedence constraint information associated with two operations, and computing from the accessed information, new information indicative of precedence constraints between operations of the plurality of operations, until all precedence constraints between couples of operations of the plurality have been determined; and b) organizing the process to be compliant with the set of precedence constraints obtained in the ordering.

* * * * *